United States Patent [19]
Kobori

[11] 3,759,156
[45] Sept. 18, 1973

[54] PHOTOGRAPHIC CAMERA PROVIDED WITH ELECTRICALLY CONTROLLED SHUTTER
[75] Inventor: Toshio Kobori, Osaka, Japan
[73] Assignee: Minolta Camera Kabushiki Kaisha, Osaka, Japan
[22] Filed: June 2, 1972
[21] Appl. No.: 259,194

[52] U.S. Cl.............. 95/31 AC, 95/31 FL, 95/53 E, 95/53 EB
[51] Int. Cl...... G03b 19/04, G03b 9/00, G03b 9/28
[58] Field of Search.................. 95/53 E, 53 EB, 57, 95/31 AC, 31 FL

[56] References Cited
UNITED STATES PATENTS
3,435,745   4/1969   Fukushima....................... 95/53 EB Primary Examiner—Samuel S. Matthews
Assistant Examiner—Russell E. Adams, Jr.
Attorney—Watson, Cole, Grindle & Watson

[57] ABSTRACT

A photographic camera provided with a curtain shutter in which the time interval between the actuation of an opening curtain and a closing curtain is controlled by an electrical control circuit, wherein when a winding means winds a film and the shutter is cocked, a stop lever restrains the turning of the winding means and releases the restraint of the winding means with the termination of the driving of the closing curtain to the rest position in response to the shutter release operation. A detecting member detects the power voltage drop in an electrical control circuit, which voltage drop is lower than a predetermined value at which proper exposure control becomes impossible to be effected by the electrical control circuit. The detecting member prevents the release of the winding means which is restrained by the stop lever at the time of exposure termination and also prevents the shutter curtain from being wound to the cocked position so as to prevent repeated photographing under improper exposure conditions.

6 Claims, 11 Drawing Figures 3,759,156

PHOTOGRAPHIC CAMERA PROVIDED WITH ELECTRICALLY CONTROLLED SHUTTER

BACKGROUND OF THE INVENTION

The present invention relates to a photographic camera having a focal plane shutter in which the time intervals respectively required between the actuation of the opening curtain and the closing curtain from their cocked positions to their rest positions are controlled by an electrical exposure control circuit. More particularly, the invention relates to a photographic camera of the type specified wherein when the power voltage drops to a value at which it becomes impossible for the exposure control circuit to provide a proper exposure time, a detecting member detects this fact to operate a stop lever so as to check the cocking of the shutter curtain by the winding means from the rest position.

In prior art electrically controlled focal plane shutters, an exposure control circuit is first operated through the shutter release operation, and a retaining member prevents the closing curtain from being driven by means of an electromagnet excited by the output of the exposure control circuit. The restraint of the opening curtain is released through the release operation to drive the opening curtain. Simultaneously, the delay circuit for the exposure control circuit is operated and, when the capacitor in the delay circuit is charged to a predetermined voltage, the output thereof demagnetizes the electromagnet to actuate the closing curtain. Thereby, the exposure time is controlled.

Therefore, if the power voltage for the exposure control circuit drops under a predetermined voltage, the magnetic force of the electromagnet becomes weak and the retaining member for retaining the closing curtain does not function. The retention of the opening curtain will be released through the release operation and simultaneously therewith the closing curtain will be driven. Accordingly, the slit space that should be formed between both curtains to determine the exposure is not formed, and even though the shutter is released from the cocked position to the rest position a malfunction occurs in that an actual exposure is not brought about.

In order to prevent such a malfunction, in the prior art apparatus, a circuit for checking the voltage of the power source battery is separately provided, however, when photographic operation is repeated without checking the voltage of that circuit, there is the possibility that repetitive mis-exposures will occur.

THE OBJECTS OF THE INVENTION

One object of the present invention is to provide a photographic camera having a curtain shutter in which the exposure is electrically controlled, wherein when the power voltage for an exposure control circuit drops under a predetermined voltage at which it becomes impossible to control the exposure properly, the winding operation for winding the shutter curtain from the rest position to the cocked position is automatically checked to signal that the power voltage has dropped, and at the same time the photographic operation of the camera is prevented.

Another object of the present invention is to provide a photographic camera having a curtain shutter in which the exposure is electrically controlled, wherein a stop lever, which restrains the winding means when the shutter is cocked and releases that restraint when the shutter is released, checks the winding means from releasing the restraint thereof and retains it in its wound position when the power voltage for the exposure control circuit drops under a predetermined voltage so that it is impossible to properly control the exposure.

Still another object of the present invention is to provide a photographic camera of the type specified in which a lever is normally operated to release the restraint of a stop lever for restraining the winding means from turning by the opening curtain gear, and the closing curtain gear is released in interlocking relationship with the releasing of the cocked shutter together with the shutter curtain by means of the winding means, and when that lever detects that both the opening curtain and the closing curtain are simultaneously driven in accordance with a low power voltage for the exposure control circuit, that lever checks the stop lever from releasing the winding means.

SUMMARY OF THE INVENTION

In order to attain the objects mentioned above, the present invention relates to a photographic camera provided with a curtain shutter, wherein an opening curtain and a closing curtain are cocked by the winding operation of the winding means from its rest position to its cocked position. The winding means is restrained by a stop lever, and after an electromagnet, excited by the output of an exposure control circuit through the release operation, retains the closing curtain. The opening curtain is driven from its cocked position to its reSt position and the exposure control circuit is operated simultaneously with the actuation of the opening curtain. When a predetermined time elapses, the output of the exposure control circuit demagnetizes the electromagnet to release the retention of the closing curtain in its cocked position. When the movement of the closing curtain is terminated a restraining release member is operated and the restraint of the winding means effected by the stop lever is released. If the power voltage for the exposure control circuit drops under a predetermined voltage, and the electromagnet excited by the output of the exposure control circuit cannot retain the closing curtain, the restraining release member detects that both the opening curtain and the closing curtain are simultaneously driven and checks the release of the winding means effected by the stop lever so as to prevent the curtain shutter from being wound to its cocked position.

BRIEF DESCRIPTION OF THE DRAWINGS

FIGS. from 7 to 10 are top views of another embodiment of the restraining release member in accordance with the present invention, wherein.

DESCRIPTION OF THE PREFERRED EMBODIMENT

Figure 1:
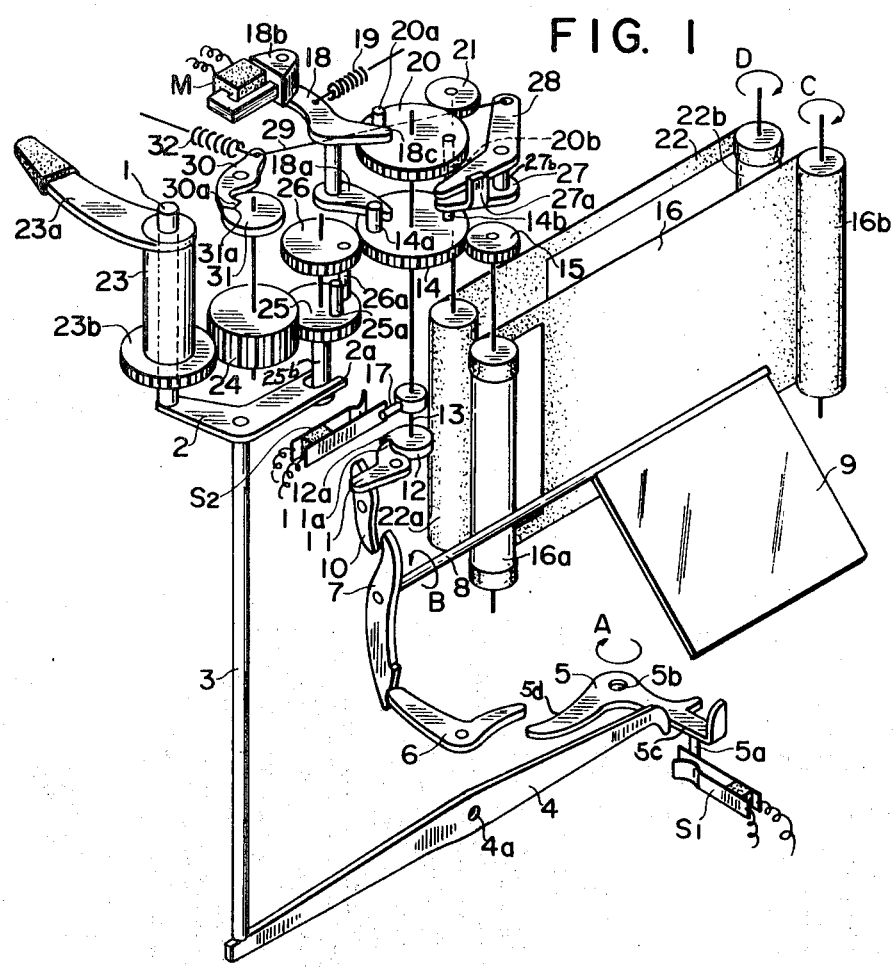
FIG. 1 is a perspective view showing the essential portion of the mechanical structure of one embodiment in accordance with the present invention.

The first embodiment will be described hereinafter refering to FIGS. 1 to 6. FIG. 1 shows the essential portion of the mechanical structure, wherein the lower end of release button 1, passing through winding lever 23a and winding shaft 23 integral with gear 23b, interlocks with release shaft 3 by release plate 2. The lower end of release shaft 3 engages with one arm of interlocking lever 4, supported on the camera body by a pin so as to pivot about pin hole 4a, and has a clockwise turning tendency (by a spring not shown in FIG. 1). When the other arm of interlocking lever 4 engages with switch lever 5, supported on the camera body by a pin so as to pivot about pin hole 5b and biased in the direction shown by arrow A by means of a spring (not shown in FIG. 1), switch lever 5 is restrained against the bias force. Switch lever 5 is provided on arm 5c thereof with switch operation pin 5a for closing power source switch $S_1$, connected in series to power source E for the exposure control circuit shown in FIG. 2, when that engagement is released and switch lever 5 is turned clockwise. Arm 5d engages with intermediate lever 6 which engages with mirror lever 7 fixed to rotary shaft 8 for movable mirror 9 in a single lens reflex camera. Shaft 8 has a tendency to rotate in the direction shown by arrow B. When mirror lever 7 is turned in the direction shown by arrow B, mirror lever 7 engages with lever 10 which contacts with opening curtain restraining lever 11. When pawl 11a of opening curtain restraining lever 11 engages with hook 12a of restraining cam plate 12, connected with opening curtain gear 14 through shaft 13, pawl 11a restrains hook 12a, and when that engagement is released opening curtain gear 14 is released. Projection 17, fixed to shaft 13, opens and closes trigger switch $S_2$ for the exposure control circuit.

Therefore, upon depressing release button 1, release shaft 3 descends and turns interlocking lever 4 counterclockwise to release the engagement of interlocking lever 4 and switch lever 5, so that switch lever 5 is turned clockwise in the direction shown by arrow A, and switch operation pin 5a closes power source switch $S_1$ for the exposure control circuit. Simultaneously therewith, arm 5d engages with intermediate lever 6 to release the restraint of mirror lever 7, and accordingly mirror lever 7 is turned counterclockwise in the direction shown by arrow B. Movable mirror 9 is turned from the position where the scene light of an object, passing through the objective lens and the diaphragm, is reflected to the exposure finder, and mirror lever 7 engages with lever 10 to turn it clockwise. Therefore, opening curtain restraining lever 12 is turned counterclockwise and pawl 11a thereof disengages from hook 12a of restraining cam plate 12 and releases the restraint of opening curtain gear 14. As a result, opening curtain 16 is driven, shaft 13 begins to rotate, and projection 17 thereof opens trigger switch $S_2$.

Opening curtain gear 14 interlocks, via gear 15, with winding shaft 16a, to which one end of opening curtain 16 is fixed, to wind opening curtain 16. The other end of opening curtain 16 is fixed and wound by opening curtain take-up shaft 16b given a driving force in the direction shown by arrow C. Further, on the top of opening curtain gear 14 restraining pin 14a and operation pin 14b are mounted.

Closing curtain gear 20 is rotatably mounted on shaft 13 above opening curtain gear 14 and has restraining pin 20a projecting from its top face and operation pin 20b projecting from its bottom face and meshes with gear 21. Gear 21 is connected to closing curtain winding shaft 22a, to which one end of opening curtain 22 is fixed to wind opening curtain 22, and the other end of closing curtain 22 is wound about closing curtain takeup shaft 22b having a driving force in the direction shown by arrow D.

The means for winding is composed of winding gear 24 meshed with gear 23b on winding shaft 23; gear 25 meshed with winding gear 24 and having shaft 25b engaged with fork portion 2a of release plate 2; gear 26 provided with projecting pin 26a with which pin 25a of gear 25 is engageable or disengageable; notched disk 31 coaxially mounted with winding gear 24; and gear 26 is meshed with opening curtain gear 14.

Therefore, upon turning winding lever 23a counterclockwise, gear 26 is turned counterclockwise via gear 23b, gear 24, gear 25, and pins 25a and 26b in clutched connection. Thus, opening gear 14 is rotated and opening curtain 16 is wound around opening curtain winding shaft 16a to be cocked. Simultaneously, operation pin 14b on opening curtain gear 14 rotates closing curtain gear 20 clockwise via operation pin 20b on closing curtain gear 20, and closing curtain 22 is wound around closing curtain winding shaft 22a to be cocked.

When the opening and closing curtains are wound in position to be cocked, opening curtain restraining pin 14a engages with connection lever 18a to turn it counterclockwise, so that closing curtain retaining lever 18, mounted coaxially with said connection lever 18a, is also turned counterclockwise. Closing curtain retaining lever 18 has on one end thereof a hook 18c for engaging with restraining pin 20a when closing curtain gear 20 is rotated to the cocked position; and also on the other arm spring 19 and armature 18b facing electromagnet M for the exposure control circuit described below.

As described above, when closing curtain retaining lever 18 is turned counterclockwise against spring 19, armature 18b comes into contact with electromagnet M and hook 18c engages with pin 20a of cocked closing curtain gear 20. Thus, projection 17 fixed to shaft 13 closes trigger switch $S_2$, and hook 12a of restraining cam plate 12, fixed to shaft 13, in the same way engages with pawl 11a of opening curtain retaining lever 11 and is retained.

Figure 2:
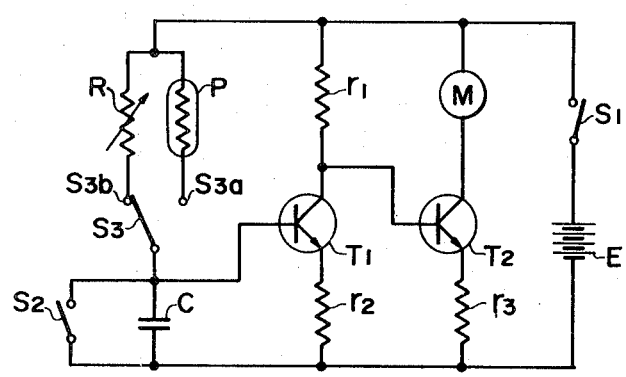
FIG. 2 is a circuit diagram of the exposure control circuit for the embodiment of FIG. 1.

The exposure control circuit is a well known circuit as shown in FIG. 2 wherein power source switch $S_1$ is connected to power battery E; light receiving element P and variable resistor R are connected in parallel with each other and connected to capacitor C via manually change-over switch $S_3$; and normally open trigger switch $S_2$ is provided across capacitor C. Change-over switch $S_3$ is a switch for changing over the exposure between automatic control and the control effected by resistance values manually set by resistor R. The connecting point between capacitor and resistor is connected to the base of transistor $T_1$, and the collector and emitter of transistor $T_1$ are respectively connected to each pole of power battery E via resistors $r_1$ and $r_2$, and the collector of $T_1$ is connected to the base of transistor $T_2$. To the emitter of transistor $T_2$ resistor $r_3$ is connected and to the collector thereof electromagnet M is connected.

Therefore, when power source switch $S_1$ is closed and trigger switch $S_2$ is also closed, transistor $T_1$ is non-conductive and transistor $T_2$ is conductive. Accordingly, electromagnet M is excited to attract armature 18b of closing curtain retaining lever 18 and closing curtain retaining lever 18 retains closing curtain gear 20. Thus, when the mechanical retaining of opening curtain retaining lever 11 is released through the release operation of the camera, the opening curtain gear train is driven, trigger switch $S_2$ is opened, and the exposure control circuit is made operative. And, when the delay time determined by the resistance (P or R) and capacitor C elapses, the non-conduction of transistors $T_1$ and $T_2$ are respectively reversed and electromagnet M is demagnetized, so that closing curtain retaining lever 18 is turned by spring 19 to release the retaining of restraining pin 20a of closing curtain gear 20, and closing curtain 22 also is driven.

Figure 5:
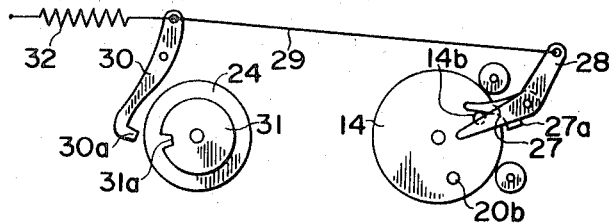
FIG. 5 shows the structure in the case where the shutter is released and the exposure control circuit effects the normal exposure control, the driving of the opening curtain is terminated, and the restraining release member releases the engagement of the stop lever and winding means.

In the process closely related to the termination of the driving of opening curtain gear 14, one end of operation lever 27 is in the turning path of opening operation pin 14b so as to engage therewith. Operation lever 27 is rotatably supported by pin 27b on the camera body and when operation lever 27 engages with opening curtain operation pin 14b as pin 14b rotates and operation lever 27 is turned clockwise as shown in FIG. 5.

On pin 27b restraining release lever 28 is rotatably supported by a pin, and so that restraining release lever 28 is turned clockwise when it interlocks with the clockwise turning of operation lever 27 projection 27a provided on operation lever 27 engages with the right side edge of restraining release lever 28. One arm of restraining release lever 28 is ordinariy retracted from the turning path of operation pin 20b of closing curtain gear 20; and, as described above, when restraining release lever 28 is turned clockwise by operation lever 27, that one arm of restraining release lever 28 is in the turning path of operation pin 20b and engages with operation pin 20b. This operation is closely related to the final process whereby pin 20b is released and restraining release lever 28 is restrained at the clockwise turning position thereof. The other arm of restraining lever 28 is fixed to one end of wire 29 and the other end of wire 29 is fixed to stop lever 30.

Stop lever 30 is provided on one arm thereof with pawl 30a engageable with notch 31a of notched disk 31 to turn coaxially and in a body with winding gear 24 and has a counterclockwise turning tendency from spring 32. Pawl 30a is biased to engage with notch 31a.

Figure 3:
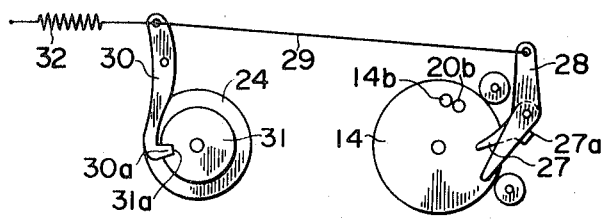
FIG. 3 is a top view showing the relative operation of the stop lever and the restraining release member in the embodiment of FIG. 1, wherein the shutter is cocked.
Figure 6:
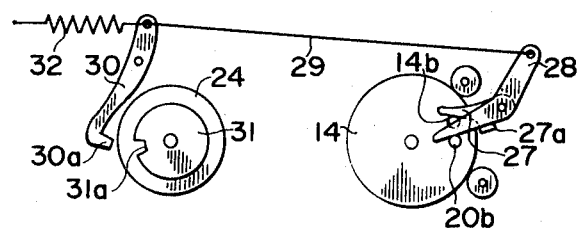
FIG. 6 shows the structure in the case where the shutter is released and the exposure control circuit effects the normal exposure control, the driving of the closing curtain is terminated, and the restraining release lever is restrained in the position to release the engagement of the stop lever and winding means.
Figure 7:
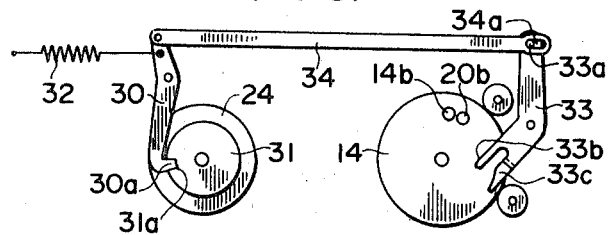
FIG. 7 shows the shutter cocked.

FIG. 3 shows the position of the components when the shutter is cocked, wherein pawl 30a engages with notch 31a to check the turning of the winding means. Now, provided the voltage of the power battery for the exposure control circuit shown in FIG. 2 is sufficient, as shown in FIG. 5 opening curtain gear 14 is turned through the shutter release operation as described above, and operation pin 14 thereof engages with operation lever 27 to turn it clockwise. Also restraining release lever 28 is turned in the same direction to turn stop lever 30 clockwise against spring 32 and pawl 30a is disengaged from notch 31a. Operation pin 20b of closing curtain gear 20 begins to rotate a predetermined time after opening curtain operation pin 14b is started and restrains restraining release lever 28 turned clockwise as described above at the clockwise turned position thereof as shown in FIG. 6. Therefore, by operating winding lever 23a, the winding operation necessary for the subsequent photographic can be effected.

Figure 4:
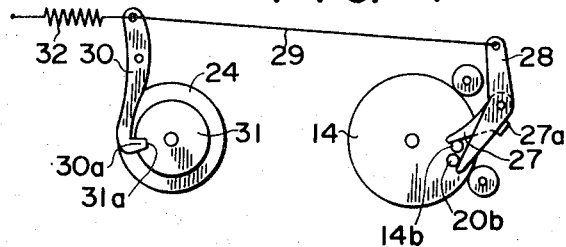
FIG. 4 shows the structure in the case where the shutter is released and because of the drop of voltage of the power source battery the exposure control circuit does not effect the normal exposure control.

Whereas, when the voltage of power battery E drops and electromagnet M does not retain closing curtain retaining lever 18 against spring 19, the retention of the opening curtain effected by opening curtain retaining lever 11 is released through the shutter release operation, and when the opening curtain is driven the closing curtain also is driven and both operation pins 14a and 20a are turned in contact with each other to engage with operation lever 27 as shown in FIG. 4. As a result, even though operation lever 27 is turned clockwise and tries to turn restraining release lever 28 in the same direction, restraining release lever 28 can not be turned because it is obstructed by closing curtain operation pin 20b, and accordingly operation lever 27 also can not be turned. Therefore, the engagement of pawl 30a of stop lever 30 and notch 31a of notched disk 31 is not released and winding gear 24 is kept restrained by stop lever 30 and the subsequent winding cannot be effected. And thus, a camera operator is signaled that the battery is deteriorated.

The second embodiment of the present invention shown in FIGS. from 7 to 10 is different from the first embodiment in that the interconnection between the restraining release lever and the stop lever comprises link 34 instead of wire 29, and the restraining release lever and the operation lever, which are separate elements, are formed into one restraining release lever 33 on the tip of which forked portion 33b is formed. And as shown in FIG. 8, when the voltage of power battery E drops operation pins 14b and 20b are fitted together in forked portions 33b and 33c in contact with each other to check the counterclockwise turning of restraining release lever 33.

Figure 9:
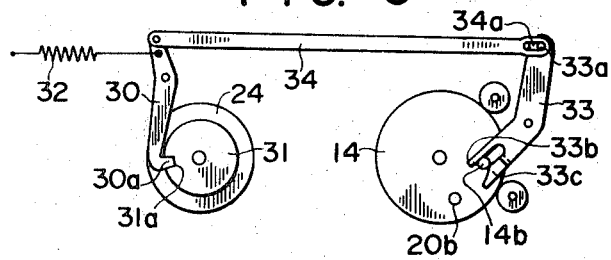
FIG. 9 shows the case where the shutter is released, the exposure control circuit effects the normal exposure control, and the driving of the opening screen is terminated.
Figure 10:
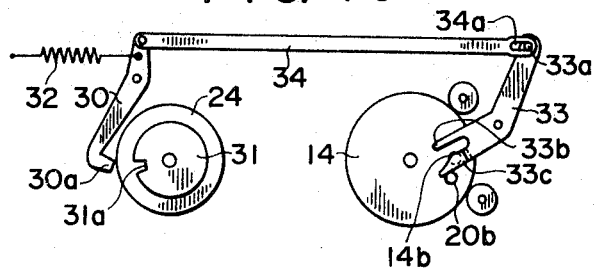
FIG. 10 shows the case where the shutter is released, and the exposure control circuit effects the normal exposure control and the driving of the closing curtain is terminated.

When the voltage of the power battery is sufficient, only operation pin 14b is fitted in the forked portion as shown in FIG. 9 to engage with arm 33b of the forked portion so as to turn restraining release lever 33a slightly clockwise. The other arm 33c of the forked portion comes into the turning path of operation pin 20b but the engagement of pawl 30a of stop lever 30 and notch 31a of notched disk 31 is still maintained. After a predetermined time elapses, operation pin 20b is turned clockwise on a large scale to turn stop lever 30 clockwise against spring 32 so as to release the restraint of winding gear 24.

Figure 8:
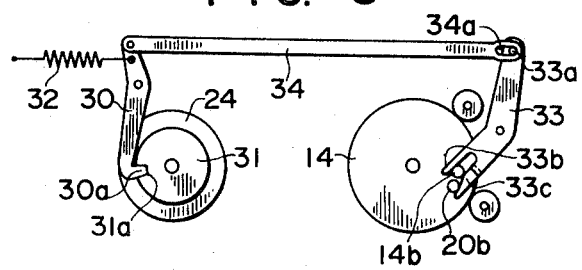
FIG. 8 shows the case where the shutter is released and the exposure control circuit does not effect the normal exposure control.
Figure 11:
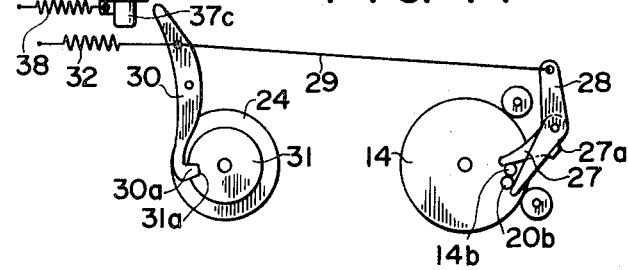
FIG. 11 is a plan view showing the structure for manually effecting the restraining release at the time when the restraining release member can not release the winding means restrained by the stop lever in the first embodiment as shown in FIG. 2.

In both embodiments, even though the shutter is operated as shown in FIGS. 4 and 8 the fact that the winding is checked produces the same results as that of a misconnection in the camera, so that after the battery is exchanged it is necessary to reset the camera in order to restore it to the normal condition. An embodiment thereof is shown in FIG. 11 which uses the structure of the first embodiment, wherein on case body 35 in the rear of the camera slot 36 is formed, and reset member 37 is guided by slot 36 and slidably disposed therein. One end of reset member 37 is projected to the outside of outer case 35 to form a reset button 37a and the other end of reset member 37 is engageable with stop lever 30 inside the camera case body to form a reset operation projection 37c and which is biased to retreat from stop lever 20 by spring 38.

Therefore, if it is impossible to wind the mechanism as shown in FIG. 11, by sliding reset button 37a to the right in FIG. 11 against spring 38 and turning winding gear 24 while releasing the engagement of pawl 30a of winding stop lever 30 and notch 31a of notched disk 31, the mechanism is reset.

The invention has been described in detail with particular reference to preferred embodiments thereof, but it will be understood that variations and modifications can be effected within the spirit and scope of the invention as described hereinabove.

What is claimed is:

1. In a photographic camera, a shutter control mechanism, comprising:
   an exposure control circuit including a battery power source, a power source switch closed by operation of the camera release mechanism, timing circuit for determining the duration of the exposure, a trigger switch for actuating said timing circuit;
   curtain shutter members including an opening curtain and a closing curtain, said opening curtain is movable from a cocked position to a rest position to initiate exposure, and said closing curtain is movable from a cocked position to a rest position to terminate exposure;
   said exposure control circuit further including control means actuated by the closing of said power source switch and deactuated by the operation of said timing circuit for controlling the movement of said curtain shutter members;
   winding means for moving said opening curtain and said closing curtain from the respective rest positions thereof to the respective cocked positions thereof;
   means for restraining said winding means with said curtain members in said cocked position;
   means for controlling the movement of said opening curtain whereby said opening curtain is retained in said cocked position and is released for movement with operation of the shutter release mechanism with said power source switch closed;
   said control means including means for retaining said closing curtain at said cocked position subsequent to the release of said means for restraining when said current to said connrol means exceeds a predetermined value;
   means for retracting said means for restraining from the restraining position thereof;
   first means responsive to the movement of said opening curtain for actuating said means for retracting;
   second means responsive to the movement of said closing curtain; and
   means actuated by said second means for preventing the actuation of said means for retracting when said control means is not actuated to retain said closing curtain at said cocked position and when said closing curtain starts to move substantially immediately from the start of movement of said opening curtain.

2. A shutter control mechanism as in claim 1 wherein:
   said first means includes a first member rotatable in response to movement of said opening curtain from said rest position to said cocked position and including a first pin mounted thereon;
   said second means includes a second member rotatable in response to movement of said closing curtain from said rest position to said cocked position and including a second pin mounted thereon;
   said shutter control mechanism further comprises clutch means for transmitting the movement of said winding means to said second member through said first member by the engagement of said first and second pins;
   said means for retracting includes a third member mounted to be rotatable between a first position out of the rotating path of said second pin and a second position in the rotating path of said second pin, said third member is normally in said first position and is rotated to said second position in response to the rotation of said first pin with the movement of said opening curtain from said cocked position to said rest position;
   said shutter control mechanism further comprising additional means for restraining said third member in said first position with said second pin rotating with said first pin to maintain the restraint of said winding means by said means for restraining, and said third member is rotated to said second position to be in engagement with said second pin for releasing said means for restraining when said second pin rotates more than a predetermined angle relative to said first pin.

3. A shutter control mechanism as in claim 2 wherein said third member includes a first lever rotatably mounted to the camera body, said first lever including a projection, and a second lever rotatably mounted to said camera body coaxially with said first lever, said first and second levers are rotatable between a first and second position and biased normally in said first position, said first and second levers are rotated to said second position by engagement with said projection when said first pin engages with said first lever, and means for preventing rotation of said first and second levers to said second position with said first pin engaging said second pin and said second pin is in engagement with said first lever.

4. A shutter control mechanism as in claim 2 wherein said means for retracting further includes a third lever rotatably mounted to said camera body and including a forked portion having a first arm engageable with said first pin and a second arm rotatable between a first and a second position, said second arm is rotated to said second position with said first pin rotating in spaced angular relationship with said second pin and with said second pin engaging said first arm, and means for preventing the rotation of said second arm to said second position with said first pin and said second pin rotating in contact with one another and said second pin is in engagement with said first arm.

5. In a photographic camera, a shutter control mechanism, comprising:
- an exposure control circuit including a battery power source, a power source switch closed with operation of the camera release mechanism, a timing circuit for determining the duration of the exposure, a trigger switch for actuating said timing circuit;
- a leading shutter member movable from a cocked position to a rest position to initiate exposure, and a trailing shutter member movable from a cocked position to a rest position to terminate exposure;
- said exposure control circuit further including control means actuated by the closing of said power source switch for restraining said trailing shutter member at said cocked position and deactuated by the operation of said timing circuit for releasing said trailing shutter member;
- means for cocking said leading and trailing shutter members;
- means for restraining said means for cocking with said leading and trailing shutter members in said respective cocked positions;
- first means responsive to the movement of said leading shutter member from said cocked position to said rest position to retract said means for restraining from the restraining position;
- second means responsive to the movement of said trailing shutter member from said cocked position to said rest position; and
- means actuated by said second means for preventing the operation of said first means when said trailing shutter member prematurely starts to move subsequent to the start of movement of said leading shutter member.

6. In a shutter mechanism for a photographic camera including a shutter opening member movable from a cocked position to a rest position for initiating exposure, a shutter closing member movable from a cocked position to a rest position for terminating the exposure, manually operative means for moving said opening member and said closing member from said respective rest positions to said respective cocked positions, means for actuating said shutter opening member to move away from said cocked position in response to shutter releasing operation, an electromagnetic means for restraining said shutter closing member at said cocked position, a timing circuit for de-energizing said electromagnetic means to release the restraint of said shutter closing member and actuate the latter from said cocked position after a time interval subsequent to the actuation of said shutter opening member, and a battery power source for energizing at least said electromagnetic means, the improvement comprising:
- an operating member for enabling cocking of said opening and closing members;
- first means for actuating said operating member in response to the movement of said shutter opening member from said cocked position to said rest position;
- second means responsive to the movement of said shutter closing member from said cocked position to said rest position; and
- means actuated by said second means for preventing the actuation of said operating member when said shutter closing member is prematurely actuated to move from said cocked position subsequent to the actuation of said shutter opening curtain.

* * * * *